United States Patent

McWilliams

[11] 3,888,538
[45] June 10, 1975

[54] VEHICLE UTILITY RACK

[76] Inventor: John T. McWilliams, 2726 Kelly St., Livermore, Calif. 94550

[22] Filed: May 25, 1973

[21] Appl. No.: 364,019

[52] U.S. Cl. .............................. 296/3; 224/42.1 F
[51] Int. Cl. ............................................. B60p 3/40
[58] Field of Search ........................ 296/3, 7, 8, 9; 224/42.1 F, 42.1 H, 42.44; 214/450

[56] References Cited
UNITED STATES PATENTS

| | | | |
|---|---|---|---|
| 1,668,401 | 5/1928 | French | 296/3 |
| 2,720,414 | 10/1955 | Hart | 296/3 |
| 2,997,330 | 8/1961 | Boultinghouse | 296/3 |
| 3,594,035 | 7/1971 | Ferguson | 296/3 |

Primary Examiner—Robert B. Reeves
Assistant Examiner—Thomas E. Kocovsky
Attorney, Agent, or Firm—Warren, Rubin & Chickering

[57] ABSTRACT

A utility rack is disclosed suitable for mounting on a vehicle, and particularly a truck carrying a camper unit, for support of various objects, such as a boat, lumber, pipe or the like, on top of the vehicle and camper unit. The utility rack is formed for movement to a load supporting position for support of the load above the top surface of the vehicle and for movement to a stored position which leaves the top surface of the vehicle unimpeded and free of potentially troublesome projections. The utility rack combines a movable post or rack supporting arm with movable retaining upright members or ears to effect compactness in the stored position.

12 Claims, 14 Drawing Figures

PATENTED JUN 10 1975 3,888,538

SHEET 1

VEHICLE UTILITY RACK

BACKGROUND OF THE INVENTION

The use of general purpose or utility racks on vehicles, and particularly pick-up trucks, is becoming increasingly popular as the owners of the vehicles attempt to increase the versatility and usefulness of their vehicles. One area in which the use of utility or storage racks has become particularly prevalent is in connection with the pick-up truck which has a camper unit mounted thereon. Since the camper unit occupies the bed of the truck, racks are often secured to the camper unit to attempt to recapture some of the load capacity of the bed of the truck in a storage structure over the camper unit. Thus, such storage racks are employed to carry boats for use while camping, lumber, pipe, ladders, or even surf boards.

Typical of some of the utility racks which have been devised for use with pick-up trucks having camper units thereon are the devices shown in U.S. Pat. Nos. 3,363,788 and 3,595,452. In the first of these patents, special brackets are mounted to the roof of the camper unit and pick-up truck and are formed for easy mounting and support of a boat on the vehicle over the camper unit. In the second patent brackets are secured to the side walls of the camper for support of an adjustable utility rack thereover.

While both of these devices have certain substantial advantages, they do present a common problem. When the utility rack is not being used it projects above the camper unit and thereby creates a potential vertical clearance problem. Some pick-up trucks, for example, with camper units mounted thereon will just barely clear the overhang in a garage or carport. With the utility rack mounted on top of the camper unit, the same truck will not be able to enter the garage, or worse, will attempt to enter the same and either damage the garage structure or the camper unit.

In U.S. Pat. No. 3,595,452 the crossbar and side posts are formed so that they can be lowered to a position closer to the top of the camper unit, but the rack construction does not permit lowering of the same below the top surface of the camper unit. Accordingly, the four posts of the rack protrude a substantial distance above the camper causing a clearance problem.

While it is possible to remove the various utility racks from the vehicles on which they are mounted, as a practical matter this does not occur, and instead, the rack construction simply imposes a limitation on the areas in which the vehicle can be operated.

Accordingly, it is an object of the present invention to provide a utility rack for a vehicle which affords a highly useful supplementary load carrying capacity and yet is formed so as not to limit operation and use of the vehicle.

Another object of the present invention is to provide a utility rack for a vehicle in which the rack may be conveniently and compactly stored while mounted on the vehicle without substantially altering the vehicle profile.

Another object of the present invention is to provide a utility rack for use with a truck having a camper unit mounted thereon which enables carrying of loads over the camper unit and storing of the rack without interfering with access to the inside of the camper unit.

It is another object of the present invention to provide a utility rack for a vehicle which may be rapidly and conveniently adjusted to accommodate different sizes and types of loads and can be mounted to a variety of different types of vehicle configurations.

It is a further object of the present invention to provide a utility rack for a vehicle which is light in weight, easy to install, inexpensive to manufacture and durable.

The utility rack of the present invention has other objects and features of advantage some of which will be set forth in more detail and will be apparent from the following description and accompanying drawing.

SUMMARY OF THE INVENTION

The utility rack of the present invention includes mounting means for mounting the rack proximate a top surface of the vehicle and load supporting means formed with a horizontally extending load portion and upstanding ear portions for retention of the load against lateral movement. The improvement in the utility rack is comprised, briefly, of the mounting means and load supporting means being formed for selective securement of the loading portion of the utility rack in a stored position at about the level or below the top surface of the vehicle; and further, the retaining uprights or ear portions are movably mounted with respect to the loading portion and formed for selective securement in a load retaining position and a moved position in which the ears are at about the level of or below the top surface of the vehicle. The mounting means is preferably formed for securement to the end wall of a camper unit or other structure carried by or forming a part of the vehicle so that a crossbar forming the loading portion of the utility rack can be lowered down below the top surface of the vehicle.

DESCRIPTION OF THE PREFERRED EMBODIMENTS

Figure 1:
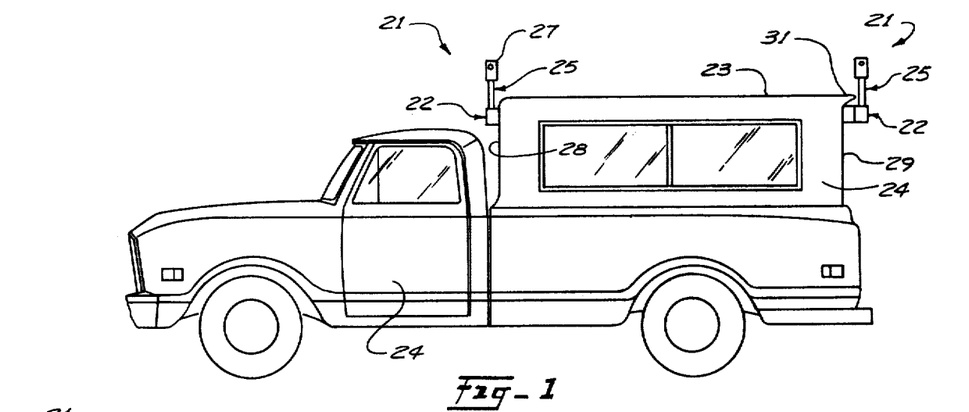
FIG. 1 is a side elevational view of a vehicle having a utility rack constructed in accordance with the present invention mounted thereon.

Referring now to FIG. 1, the utility rack, generally designated 21, of the present invention can be seen to be comprised of mounting means or brackets 22 which are formed for mounting of the rack proximate to and below top surface 23 of the vehicle. In this case, the vehicle is a pick-up truck 24 having top surface 23 formed as the roof of a camper unit mounted on the truck. As used herein, the expression "top surface" of the vehicle shall include the top surface of the camper unit or a tool box or other structure mounted on the vehicle as well as the vehicle itself. Mounted to mounting means or brackets 22 is load supporting means, generally designated 25, which includes a horizontally extending loading portion or crossbar 26 supported on posts 36 and at least one and preferably a pair of ear portions or uprights 27, formed for retention of the load against lateral movement. Load supporting means 25 is mounted to bracket means 22 for vertical movement of loading portion or crossbar 26.

Figure 2:
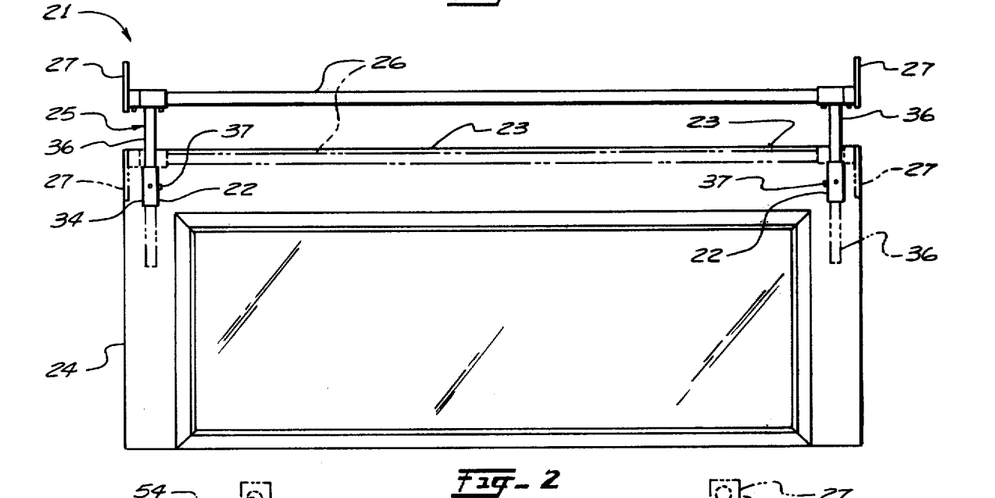
FIG. 2 is an enlarged, end elevational view of the vehicle and utility rack of FIG. 1.

As will be seen in FIG. 2, mounting means 22 is usually provided by a pair of brackets 22 and a pair of vertical posts 36 which are used to support crossbar 26 adjacent the ends thereof. In order to enable lowering of crossbar 26 from a load supporting position above roof 23 of the camper to a stored position below the roof of the camper, mounting means 22 are formed for securement to the fornt end wall 28 and the rear end wall 29 so the crossbar 26 does not engage the roof of the camper when lowered. Vertical reciprocation of the crossbar to and from the load supporting position (shown in solid lines in FIG. 2) and the stored position (shown in phantom lines in FIG. 2), posts 36 are, in one aspect of the present invention, mounted in sleeve means or portions 34 of mounting brackets 22. The posts may be selectively locked in the stored or load supporting position by fastener means 37, as will be more fully set forth hereinafter.

In order to minimize the distance which crossbar 26 must be vertically reciprocated as well as the length of posts 36, ears 27 are movably mounted with respect to crossbar 26. Thus ears or uprights 27 are formed for selective securement in a load retaining position in which they extend upwardly of crossbar 26 (as is shown in solid lines in FIG. 2) and in a moved position, preferably downwardly extending (as is shown in phantom lines in FIG. 2). As will be seen from FIG. 2, merely lowering crossbar 26 to the stored position shown in phantom lines would result in the ears extending above the top surface 23 of the camper unit. It is an important feature, however, of the utility rack of the present invention that the ears be formed for remounting in a position in which they do not extend above top surface 23 of the vehicle, even when the crossbar is substantially at the level of the roof of the camper unit. This construction allows the utility rack of the present invention to be stored in a very compact position while mounted on the vehicle, and the top surface of the vehicle is left unobstructed.

Figures 3, 4:
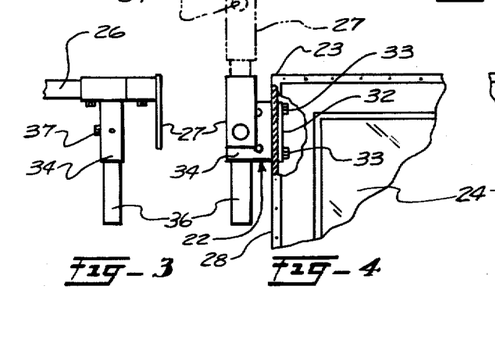
FIG. 3 is an enlarged, fragmentary view of one side of the utility rack of FIG. 2.
FIG. 4 is an enlarged, fragmentary, partially broken away view of the front mount of the utility rack of FIG. 1.
Figure 5:
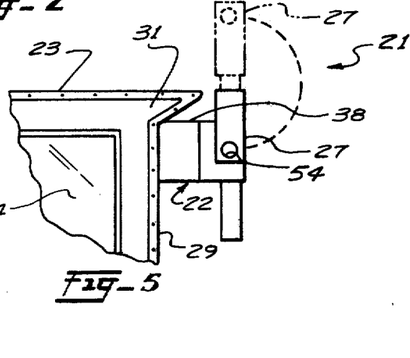
FIG. 5 is an enlarged, fragmentary view of the rear mount of the utility rack of FIG. 1.

As wil be seen from FIGS. 1 and 5, camper units often include an overhang 31 or rain gutter which acts as a shield to prevent entry of water into the camper at a rear door or window thereof. Accordingly, rear brackets 22 are preferably formed with extension portions 38 dimensioned to enable telescoping of posts 36 downwardly with crossbar 26 passing beyond overhang 31. In the front mounted bracket 22 shown in FIG. 4, an extension is not required. With reference to FIG. 4, bracket 22 can be seen to be secured to a bearing plate 32 located on the inside of wall 28 of the camper unit by fasteners or bolts 33. Bearing plate 32 distributes the load of the bolts over a substantial area of the wall 28 to prevent stress concentrations on the wall of the camper unit at bolts 33. A similar bearing plate and pair of bolts can be used to mount brackets 22 to the rear wall of the camper unit.

Figures 6, 7:
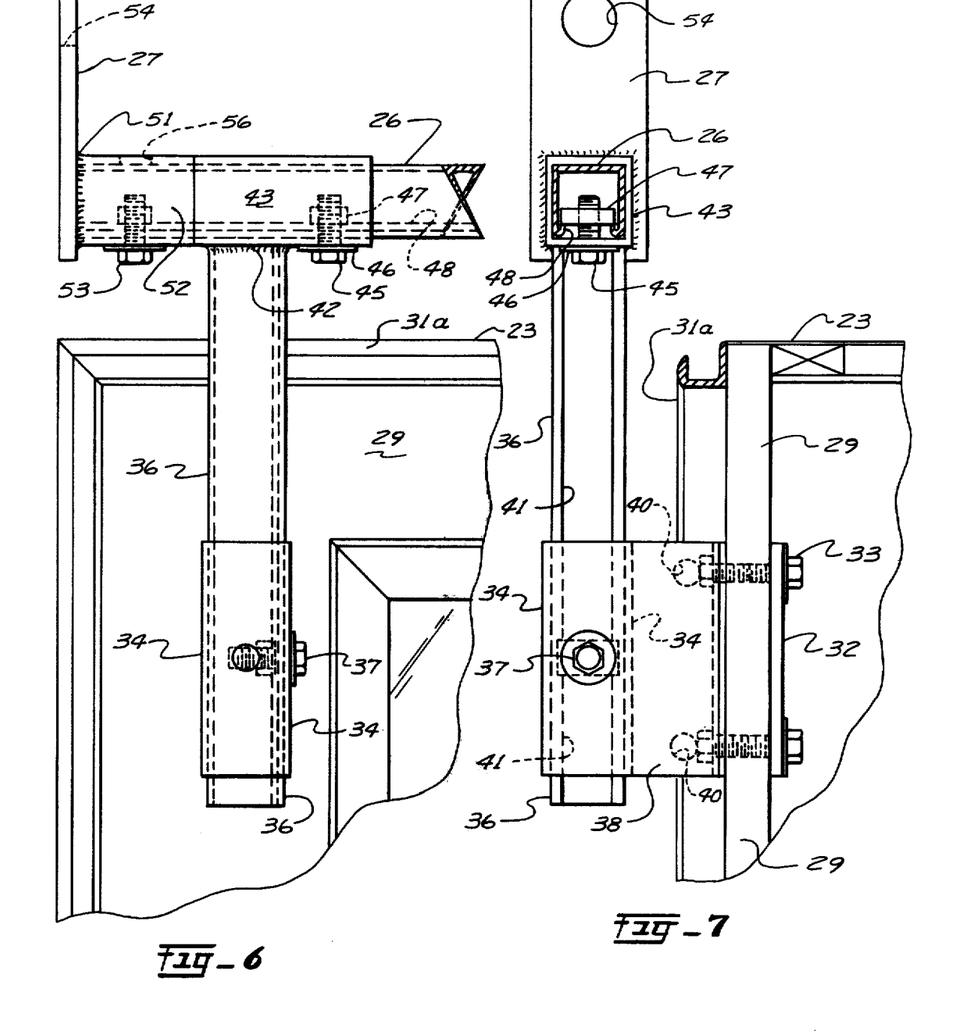
FIG. 6 is a further enlarged, fragmentary, end elevational view of one side of the utility rack of FIG. 1.
FIG. 7 is a fragmentary, side elevational view, partially in cross section, of the utility rack of FIG. 6.

Referring now to FIGS. 6 and 7, the details of construction of the rack of the present invention can be more fully described. It is preferable that posts 36 be formed with a U-shaped cross-section defining a vertically extending slot or opening 41 into which a fastener or securement means 37 is mounted. Securement means 37 is formed for selective securement of the post 36 to sleeve portion 34 of the mounting bracket at any desired vertical height along slot 41. Fastener 37 passes through an opening in sleeve 34, and slot 41 allows the post to be vertically reciprocated or telescoped in sleeve 34 by simply loosening securement fastener 37 and sliding the post upwardly or downwardly within sleeve 34. It is preferable to form post 36 from a U-shaped channel material sold under the trademark UNISTRUT manufactured by Unistrut Northern California, Inc. of San Leandro, Calif. In addition to forming post 41 of this material, it is preferable that load supporting crossbar 26 be formed of such a U-shaped channel, and the details of construction of the channel and fastener 37 are the same as and can best be seen in FIG. 7 in connection with the mounting of crossbar 26 to post 36. Thus, mounted upon upper end of post 36 by weld 42 is a sleeve means 43 dimensioned for demountable receipt of crossbar 26 therein. As will be seen from FIG. 7, the legs of the U-shaped channel are rolled back upon themselves at 48 so that locking element 47 will engage the same. Sleeve 43 is formed with an opening therein and bolt 45 passes through washer 46 and the opening in sleeve 43 for connection to the locking element 47. Upon tightening of bolt 45 the locking element is cinched down against the rolled back legs 48 of the U-shaped crossbar. Fastener 37 is formed in an analogous manner and loosening of the bolt will allow the locking element to slide along the rolled back leg portions for vertical telescoping or reciprocation of the posts.

In order to accommodate vehicles or camper units and loads of varying width, sleeve 43 is preferably formed for extension of cross bar 36 horizontally beyond the sleeve to any desired width. Securement means or bolt 45 will releasably secure the crossbar to sleeve 43, and accordingly post 36. Thus, crossbars of different width may be readily interchanged to accommodate variations in camper dimensions or extra wide loads.

In order to enable selective movement of ears 27 from a load retaining position to a moved or stored position, it is preferable that the ears be secured, such as by weld 51, to collar means 52. Collar means 52 is fastened by fastener 53 to crossbar 26, as it projects beyond sleeve 43. Fastener 53 is again preferably formed as described in detail in connection with fastener 45.

As shown in FIGS. 6 and 7, ears 27, which are formed with openings 54 for securement of tie-down devices such as ropes or the like, are secured to crossbar 26 in the load retaining position. To mount the ear or upright 27 in moved or stored position, fastener 53 is unfastened and the ear removed from the end of crossbar 26. The ear is then rotated by 180° and the collar 52 remounted on the end of the crossbar. Fastener 53 may now be inserted through an opening 56 on the opposite side of the collar for securement of the ears in the moved position for compact storage of the utility rack. Thus, the pair of opposed openings in collar 52 enables selective inverting and mounting of ear 27 in either a position suitable for storing of the rack or a position providing a retainer against sideways movement of the load or for securement of a tie-down thereto.

In order to enable use of the brackets of the present invention in applications where it is not possible or convenient to mount the brackets to the end walls of the vehicle or camper unit, it is preferable that bracket 22 be further formed with openings 40 (FIG. 7) to which fasteners 33 can extend to secure brackets to the side walls of the camper unit. When side mounting of brackets 22 is employed, it is not possible to lower crossbar 26 to a position below top surface 32. It is possible, however, to lower the crossbar until it rests on the top surface of the camper unit, and with the movable uprights or ears 27 of the present invention to further rotate the ears and secure them in a downward position so that the overall utility rack extends above the level of the top surface of the vehicle by only the width of the crossbar. As used herein, the expression "about the level of the top surface" of the camper unit or vehicle shall include side mounting of the brackets so that the crossbar may be brought down to rest on the top surface and extends above the same only by the heighth of the crossbar.

It should be noted that the camper unit of FIGS. 6 and 7 is shown as formed with a rain gutter 31a instead of overhang 31.

Figures 8, 9, 9A:
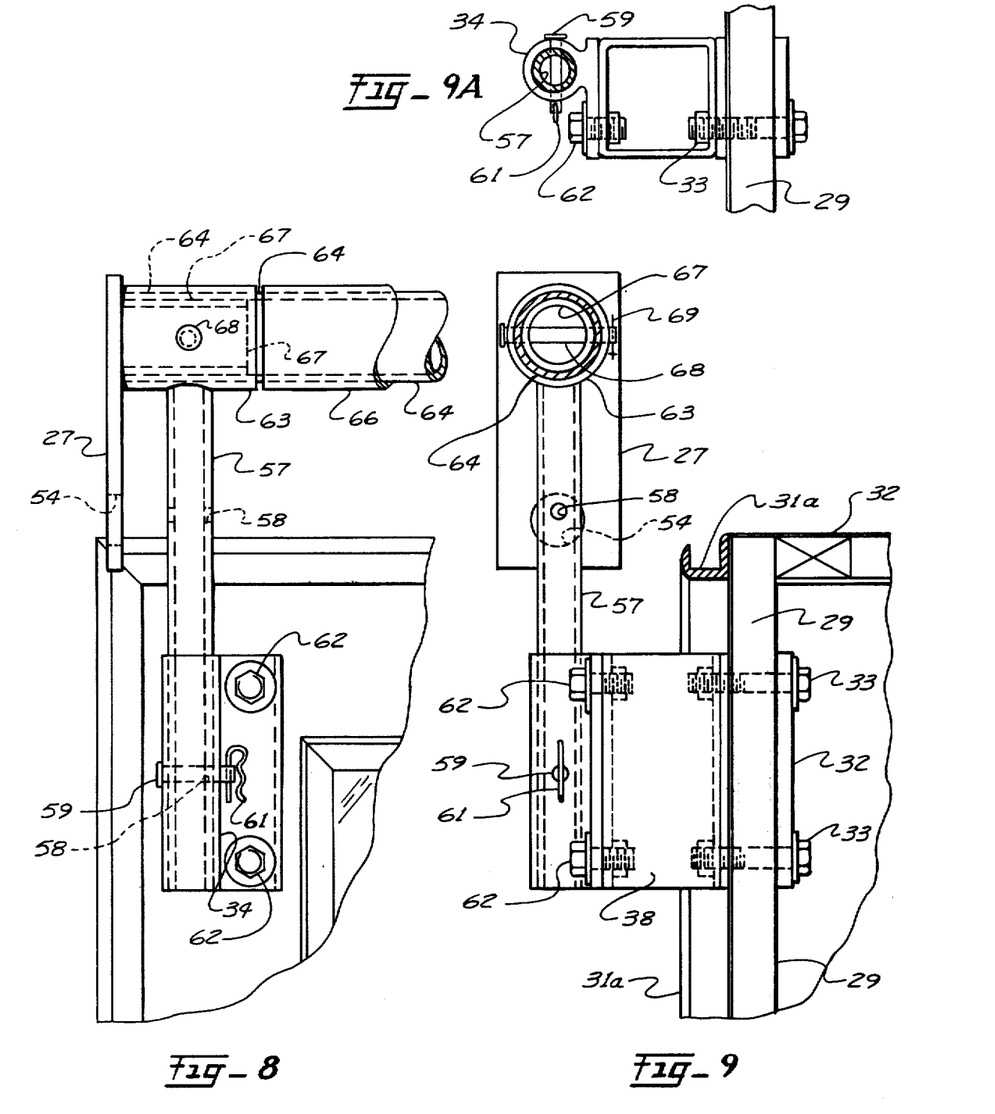
FIG. 8 is a fragmentary, end elevational view of an alternative embodiment of the utility rack of the present invention.
FIG. 9 is a fragmentary, side elevational view, partially in cross-section, of the utility rack of FIG. 8.
FIG. 9A is a fragmentary, top view of the utility rack of FIG. 9.

Referring now to FIGS. 8, 9 and 9A, an alternative embodiment of the utility rack of the present invention is shown in which vertical posts 57 are formed as cylindrical tubes having openings 58 positioned at predetermined intervals over the heighth of the posts. In order to mount posts 57 to cylindrical sleeve 34, a pin 59 is passed through an opening in sleeve 34 and then through openings 58 in post 57 until it passes out through a second opening in the cylindrical sleeve. Pin 59 is preferably held against removal from the sleeve by a second perpendicularly oriented pin 61, such as a cotter pin or clevis pin. As best may be seen in FIG. 9A, the extension 38 to position the posts outwardly of rain gutter 31a is formed as a rectangular tubular element which is held at its inner end by fasteners 33 to wall 29 and is secured to sleeve 34 by fasteners 62. This construction allows the interchanging of extension element 38 of various heights to accommodate various degrees of overhang of rain gutters and the like.

Mounted on the upper end of post 57 is a cylindrical sleeve 63 which is dimensioned for receipt of cylindrical tubular crossbar 64. Sleeve 63 is formed for passage of crossbar 64 therebeyond, but in the form of the bracket shown in the drawings, the crossbar terminates at the outer edge of sleeve 63. Ear 27 is secured to collar means 67 which extends inside tubular crossbar 64 and is secured to the crossbar and sleeve by means of pin 68 and associated clevis pin 69. As shown in FIGS. 8 and 9, ear 27 is fastened in the moved or stored position while crossbar 64 is secured at sleeves 34 in the load supporting position. In order to raise ears 27 pin 69 may be removed and then pin 68 removed to allow rotation of the ears to the upward position and repinning of the same to retain the load against sideways movement.

In order to facilitate loading of objects onto the rack of FIGS. 8, 9 and 9A, a roller element 66 is preferably loosely mounted on crossbar 64 for rotation with respect thereto. Sleeves 63 retain the roller element therebetween as it rotates about the crossbar. If necessary or desirable, the roller element can be removed from the crossbar by raising one of posts 57 out of sleeves 34 and sliding sleeve 63 axially of the crossbar until it slides off the end of the same to free the roller element.

Figure 10:
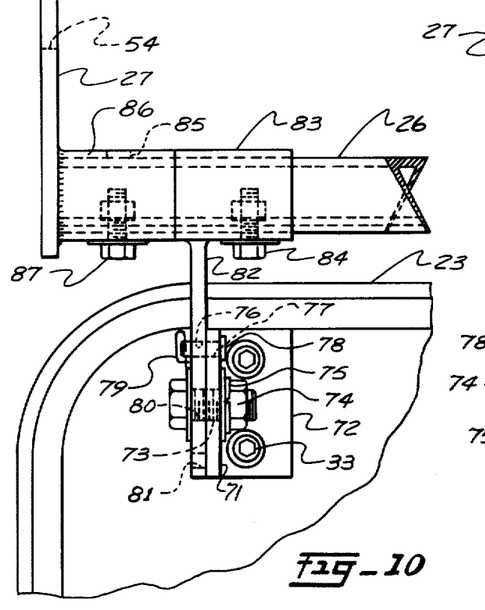
FIG. 10 is a fragmentary, end elevational view of still a further alternative embodiment of the utility rack of the present invention.
Figure 11:
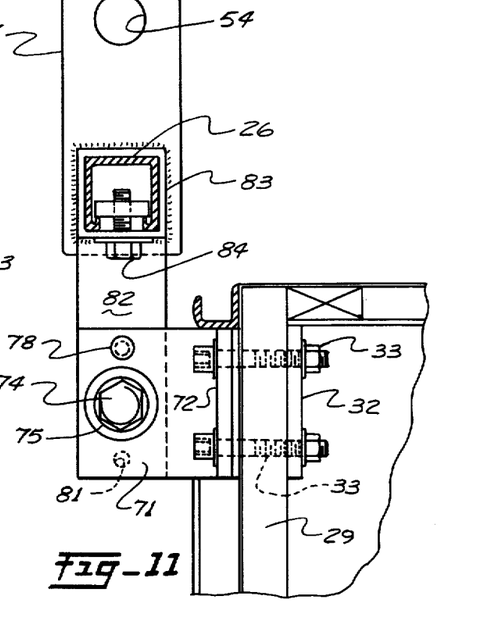
FIG. 11 is a fragmentary, side elevational view, partially in cross-section, of the utility rack of FIG. 10.
Figure 12:
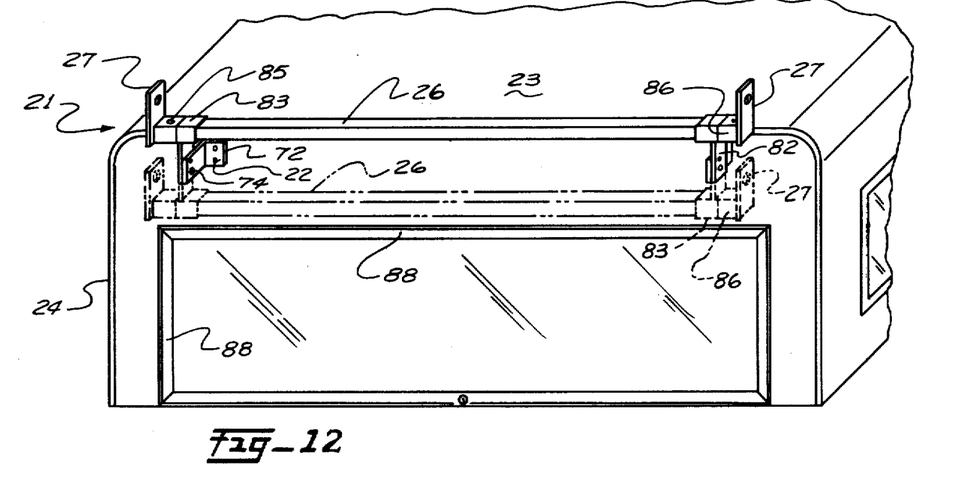
FIG. 12 is a top perspective view of the utility rack of FIGS. 10 and 11.

In FIGS. 10, 11 and 12, another form of the utility rack of the present invention is shown in which an L-shaped bracket having a flange 72 and an outwardly extending portion 71 is provided. Fasteners 33 are again employed with a bearing plate 32 to mount the bracket to a wall of the camper unit. Outwardly projecting portion 71 of the bracket is formed with an opening 73 for pivotal connection of arm 82 thereto. The pivotal connection is effected by bolt 74 which passes through a pivotal opening 80 in arm 82 and aligned and registered opening 73 in bracket 71 and subsequently through a lock washer 75 to a mating nut mounted on the end of the bolt. In order to lock the arm in an upwardly extending position as shown in FIGS. 10 and 11, aligned and registered openings 76 and 77 in arm 80 and bracket 71, respectively, may have a pin 78 mounted therethrough and secured by clevis pin 79. A second locking opening 81 disposed below pivotal opening 80 in arm 82 is provided so as to enable locking of the arm in the lowered position shown in phantom in FIG. 12 by means of pin 78.

As will be seen from FIG. 12, however, swinging or folding of crossbar 26 down to the lowered position places the crossbar immediately adjacent a door or window or other opening 88 in the rear end of the camper unit. If ears 27 are not moved, they will extend down over door or window 88 limiting access to the camper. Arm 82 has a sleeve 83 secured thereto, and a fastener 84 may be employed to secure U-shaped crossbar 26 to the upper ends of the arms. The crossbar extends beyond sleeve 83 and ears 27 are mounted on a collar or sleeve 86 and secured to crossbar 26 by fastener 87. When arms 82 are pivoted downwardly to the stored position, ears 27 are further moved from what would be a downwardly extending position to an upwardly extending position, as shown in phantom lines in FIG. 12. This is accomplished by removing fastener 87 from sleeve 86 to enable the ears to be pulled axially off crossbar 26, turned 180° and re-mounted on the crossbar. The fastener may then be inserted through opening 85 and secured to the locking element which engages the rolled over flanges of the U-shaped crossbar 26. Thus, the crossbar may be pivoted or folded down to the stored position and the ears reversed to free the door or window 88 for use when the rack is in the stored position.

Figure 13:
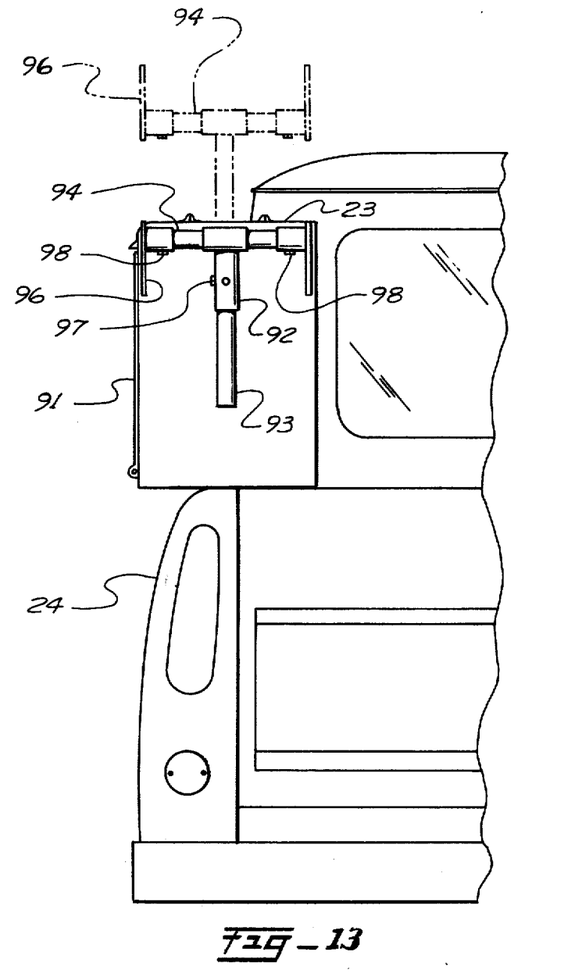
FIG. 13 is an end elevational view of still a further alternative embodiment of the utility rack of the present invention shown mounted on the tool box of a truck.

The utility rack shown in FIG. 13 is mounted on a tool or utility box 91 on vehicle 24, such as are commonly employed and mounted on pick-up trucks. The top surface of the box is the top surface of the vehicle in this application. This utility rack is formed with a bracket having a sleeve 92 in which vertical post 93 may be selectively pinned by fastener 97 in the load supporting position shown in phantom lines or the stored position shown in solid lines. Mounted to the upper end of post 93 is a horizontally extending crossbar 94 having a pair of ears 96 releasably secured thereto by fasteners 98. Thus, in a manner analogous to the use of a pair of brackets and posts, a single post is used to carry a relatively short crossbar with uprights or retaining ears 93 to act as a pipe, lumber or ladder rack above tool box 91. As was true in connection with the previously described racks, the rack of FIG. 13 advantageously employs the movable ears or uprights to enable compact storage of the utility rack below the top surface of the vehicle adjacent to which the rack is mounted.

As is the case with all of the utility racks herein described, it is preferable that a second similarly formed rack be mounted on the front end of the tool box to cooperate with the rear mounted rack in supporting the load. Additionally, it will be understood that a pair of racks can advantageously be mounted to the opposite side of the vehicle over a second utility box. Still further it is possible to combine a pair of rear racks as shown in FIG. 13 with a single front rack having a crossbar that extends across the vehicle between two tool box mounted brackets.

I claim:

1. In a utility rack for mounting on a vehicle including mounting means formed for mounting said rack to said vehicle proximate a top surface thereof and load supporting means formed with a horizontally extending loading portion for support of a load thereon and an upstanding ear portion extending above said loading portion for retention of said load against lateral movement, said load supporting means being mounted to said mounting means for vertical movement of said loading portion, the improvement comprising:
   said mounting means being formed for mounting to an end wall of said vehicle proximate said top surface, and said mounting means and said load supporting means being formed for selective securement of said loading portion in a load supporting position disposed above said top surface and in a stored position between about the level of said top surface and below said top surface; and
   said ear portion being movably mounted with respect to said loading portion and formed for selective securement in a load retaining position extending above said loading portion and in a moved position between about the level of said top surface and below said top surface when said loading portion is in said stored position for compact storage of said utility rack with said top surface of said vehicle being substantially unobstructed.

2. A utility rack for a vehicle as defined in claim 1 wherein,
   said ear portion is mounted for securement in said moved position with said ear portion extending downwardly of said loading portion.

3. A utility rack for a vehicle as defined in claim 1 wherein,
   said mounting means is further formed for vertical reciprocation of said load supporting means with respect thereto to effect vertical movement of said loading portion between said load supporting position and said stored position.

4. A utility rack for a vehicle as defined in claim 3 wherein,
   said mounting means is formed with an extension portion dimensioned to enable vertical reciprocation of said load supporting means past an overhang on said end wall proximate said top surface.

5. A utility rack for a vehicle as defined in claim 1 wherein,
   said mounting means is formed as a pair of brackets each formed for mounting to an end wall of said vehicle in relatively spaced apart relation, said brackets each being further formed with sleeve means dimensioned for sliding receipt of load supporting means therein;
   said load supporting means is formed as a pair of posts slidably mounted for vertical reciprocation in said sleeve means;
   said loading portion is formed as a horizontally extending crossbar member secured proximate the ends thereof to said posts; and
   said ear portion is provided by a pair of ears mounted proximate the ends of said crossbar.

6. A utility rack for a vehicle as defined in claim 5 wherein,
   said vertical posts are formed with a U-shaped cross-section defining vertically extending slots, and securement means mounted to extend into said slots and formed to enable selective securement of said posts to said sleeve means at any desired vertical height along said slots.

7. A utility rack for a vehicle as defined in claim 5 wherein,
   said posts are each formed with a horizontally oriented sleeve means secured adjacent an upper end thereof and dimensioned for demountable receipt of said crossbar therein and for extension of said crossbar horizontally therebeyond, and securement means for releasably securing said crossbar to said sleeve means whereby crossbars of varying length can be employed in the utility rack.

8. A utility rack for a vehicle as defined in claim 5, and
   a roller element mounted on said crossbar for rotation with respect thereto.

9. A utility rack for a vehicle as defined in claim 5 wherein,
   said ears are each secured to collar means formed for and mounted to the ends of said crossbar, and securement means releasably securing said collar means to said crossbar.

10. A utility rack for a vehicle as defined in claim 1 wherein,
    said mounting means is formed as a pair of brackets each formed for mounting on an end wall of said vehicle in relatively spaced apart relation, said brackets being further formed for pivotal connection of said load supporting means thereto;
    said load supporting means is formed as a pair of arms pivotally connected to said brackets;
    said loading portion is formed as a horizontally extending crossbar secured proximate the ends thereof to said posts; and
    said arms being dimensioned for pivotal movement from said load supporting position to said stored position.

11. A utility rack for a vehicle as defined in claim 1o wherein, said arms are dimensioned and said brackets formed for securement of said utility rack to said vehicle to position said crossbar above an opening in said end wall when said crossbar is in stored position;

said ear portion being provided by a pair of ears demountably secured to the ends of said crossbar, said ears being further formed for mounting to said crossbar in said moved position to extend away from said opening in said end wall.

12. A utility rack for a vehicle as defined in claim 1 wherein, said mounting means is formed as a bracket formed for mounting to an end wall of said vehicle;

said load supporting means is formed by a post movably mounted to said bracket, a horizontally extending crossbar mounted to the upper end of said post, and a pair of ears movably mounted to the ends of said crossbar.

* * * * *